(12) United States Patent
Kim et al.

(10) Patent No.: US 8,471,810 B2  
(45) Date of Patent: Jun. 25, 2013

(54) MOBILE TERMINAL

(75) Inventors: Chi-Young Kim, Seoul (KR); Hyun-Bo Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 962 days.

(21) Appl. No.: 12/545,233

(22) Filed: Aug. 21, 2009

(65) Prior Publication Data

US 2010/0053861 A1 Mar. 4, 2010

(30) Foreign Application Priority Data

Sep. 2, 2008 (KR) .................. 10-2008-0086493

(51) Int. Cl.
*G09G 5/00* (2006.01)

(52) U.S. Cl.
USPC ........................................... 345/156

(58) Field of Classification Search
None
See application file for complete search history.

(56) References Cited

U.S. PATENT DOCUMENTS

| | | | | |
|---|---|---|---|---|
| 4,771,276 A | * | 9/1988 | Parks | 345/173 |
| 4,898,555 A | * | 2/1990 | Sampson | 445/22 |
| 5,162,783 A | * | 11/1992 | Moreno | 345/175 |
| 5,936,615 A | * | 8/1999 | Waters | 345/173 |
| 2001/0033267 A1 | * | 10/2001 | Kim et al. | 345/156 |
| 2002/0021278 A1 | * | 2/2002 | Hinckley et al. | 345/156 |
| 2002/0180691 A1 | * | 12/2002 | Wong et al. | 345/156 |
| 2007/0046646 A1 | * | 3/2007 | Kwon et al. | 345/173 |
| 2008/0153581 A1 | * | 6/2008 | Hedrick et al. | 463/25 |
| 2010/0053861 A1 | * | 3/2010 | Kim et al. | 361/679.01 |

FOREIGN PATENT DOCUMENTS

| | | |
|---|---|---|
| CN | 1445719 | 10/2003 |
| CN | 1949905 | 4/2007 |
| WO | WO 02/097597 | 12/2002 |
| WO | WO 2007/103631 | 9/2007 |

OTHER PUBLICATIONS

Chinese Office Action dated Mar. 26, 2012 for Application No. 200910171769.9 and English Translation.
European Search Report dated Dec. 3, 2009.
Chinese Office Action dated Dec. 17, 2012 for Application 200910171769.9 and English translation.

* cited by examiner

*Primary Examiner* — Peter Vincent Agustin
(74) *Attorney, Agent, or Firm* — KED & Associates, LLP

(57) ABSTRACT

A mobile terminal is provided that includes a housing having an opening, a display provided in the opening of the housing, a bezel provided on the housing, and at least one sensor or a touch screen/sensor provided at the bezel. The at least one sensor or touch screen detects a user selection on the bezel such that an image on the display changes or a command is performed by the mobile terminal. The sensor or the touch screen/sensor also allows images on the main display to be not hidden because items or commands are selected on the bezel.

20 Claims, 6 Drawing Sheets

MOBILE TERMINAL

The present application claims priority from Korean Application No. 10-2008-0086493, filed Sep. 2, 2008, the subject matter of which is hereby incorporated by reference.

BACKGROUND

1. Field

Embodiments of the present disclosure may relate to a mobile terminal capable of outputting light associated with an operation of a unit for inputting a command.

2. Background

Mobile terminals may be divided into mobile terminals and stationary terminals according to their mobility. The mobile terminals may be divided into handheld terminals and vehicle mount terminals according to whether a user directly carries his terminal. The mobile terminal may capture still images or moving images, play music or video files, play games, receive broadcast and the like, so as to be implemented as an integrated multimedia player (device).

BRIEF DESCRIPTION OF THE DRAWINGS

Arrangements and embodiments may be described in detail with reference to the following drawings in which like reference numerals refer to like elements and wherein.

DETAILED DESCRIPTION

A description may now be provided of mobile terminals with reference to the accompanying drawings. Suffixes "module" and "unit" or "portion" for components as described herein merely provided for ease of description and are not meant to limit the scope. The terms "module", "unit" or "portion" may be used together.

A mobile terminal may be implemented using different types of terminals such as mobile phones, smart phones, notebook computers, digital broadcast terminals, Personal Digital Assistants (PDA), Mobile Multimedia Players (PMP), navigators and the like.

Figure 1:
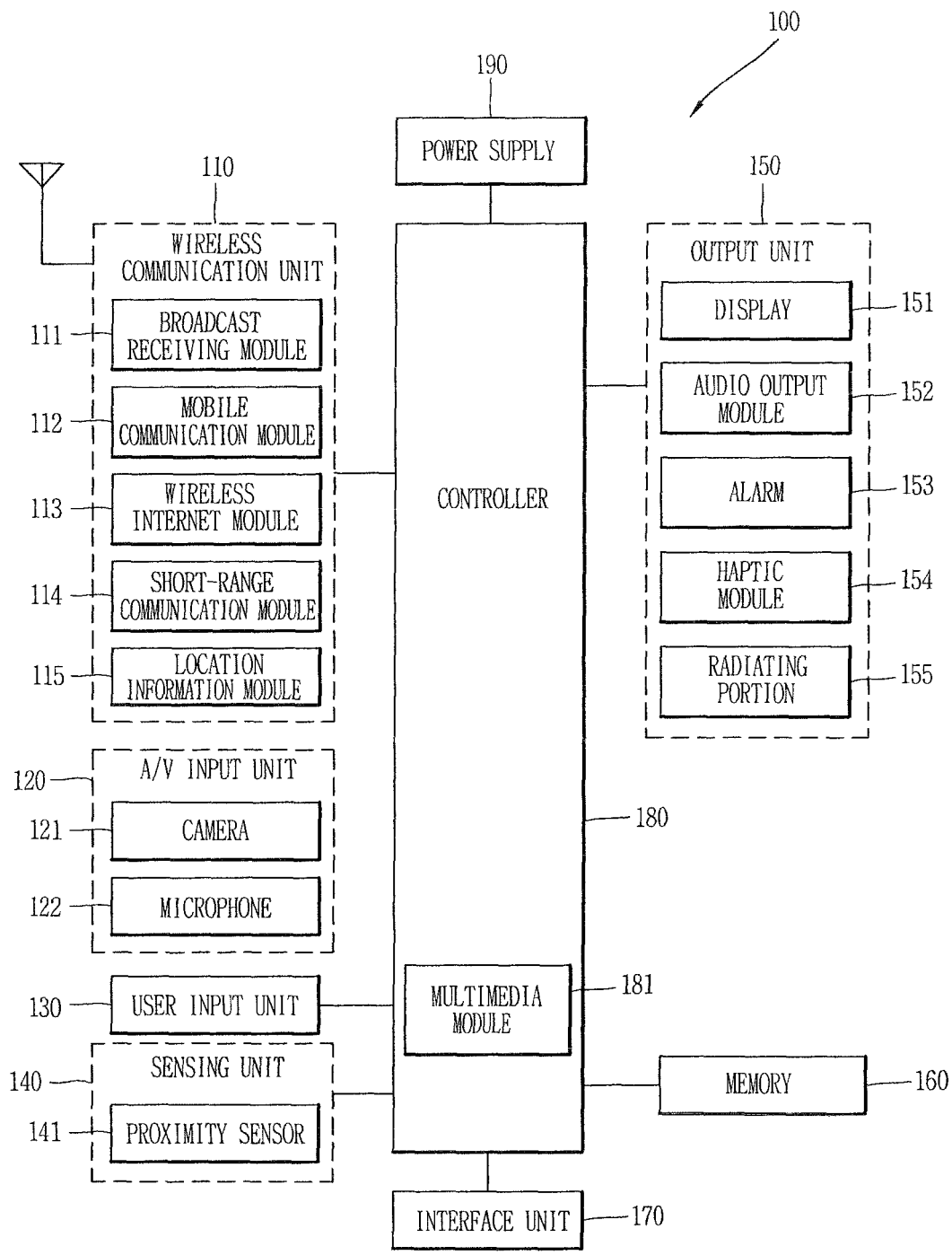
FIG. 1 is a block diagram of a mobile terminal in accordance with one example embodiment.

FIG. 1 is a block diagram of a mobile terminal in accordance with one example embodiment. Other embodiments and arrangements may also be provided. The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, although it is understood that all the illustrated components are not required. A greater number or fewer number of components may alternatively be implemented.

The wireless communication unit 110 may include one or more modules that permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 (or position-location module) and the like.

The broadcast receiving module 111 may receive a broadcast signal and/or broadcast associated information from an external broadcast managing entity via a broadcast channel. A broadcast receiving antenna 116 included in the broadcast receiving module 111 may extend from one portion of a main body of the terminal.

The broadcast channel may include a satellite channel and a terrestrial channel. The broadcast managing entity may indicate a server that generates and transmits a broadcast signal and/or broadcast associated information or a server that receives a pre-generated broadcast signal and/or broadcast associated information and sends them to the mobile terminal 100. The broadcast signal may be implemented as a TV broadcast signal, a radio broadcast signal, and/or a data broadcast signal, for example. The broadcast signal may further include a data broadcast signal combined with a TV or radio broadcast signal.

Examples of broadcast associated information may include information associated with a broadcast channel, a broadcast program, a broadcast service provider, and/or the like. The broadcast associated information may be provided via a mobile communication network, and may be received by the mobile communication module 112.

The broadcast associated information may be implemented in various formats. For example, broadcast associated information may include an Electronic Program Guide (EPG) of Digital Multimedia Broadcasting (DMB), an Electronic Service Guide (ESG) of Digital Video Broadcast-Handheld (DVB-H), and the like.

The broadcast receiving module 111 may receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as the memory 160.

The mobile communication module 112 may transmit/receive wireless signals to/from at least one of network entities (e.g., a base station, an external mobile terminal, a server, etc.) on a mobile communication network. The wireless signals may include an audio call signal, a video (telephony) call signal, and/or various formats of data according to transmission/reception of text/multimedia messages.

The wireless Internet module 113 may support wireless Internet access for the mobile terminal 100. The wireless Internet module may be internally or externally coupled to the mobile terminal 100. Examples of such wireless Internet access may include a Wireless LAN (WLAN) (Wi-Fi), Wireless Broadband (Wibro), Worldwide Interoperability for Microwave Access (Wimax) and/or the like.

The short-range communication module 114 may denote a module for short-range communications. Suitable technologies for implementing this module may include BLUETOOTH, Radio Frequency IDentification (RFID), Infrared Data Association (IrDA), Ultra-WideBand (UWB), ZigBee, and/or the like.

The location information module 115 may detect or calculate a position of the mobile terminal 100. An example of the location information module 115 may include a Global Position System (GPS) module.

As shown in FIG. 1, the A/V input unit 120 may provide audio or video signal input to the mobile terminal 100. The A/V input unit 120 may include a camera 121 and a microphone 122. The camera 121 may receive and process image frames of still pictures or video obtained by image sensors in a video call mode or a capturing mode. The processed image frames may be displayed on a display 151.

The image frames processed by the camera 121 may be stored in the memory 160 or may be transmitted to the exterior via the wireless communication unit 110. Two or more cameras 121 may be provided according to configuration of the mobile terminal 100.

The microphone 122 may receive an external audio signal while the mobile terminal 100 is in a particular mode, such as a phone call mode, a recording mode, a voice recognition mode, and/or the like. The audio signal may be processed into digital data. The processed digital data may be converted for output into a format transmittable to a mobile communication base station via the mobile communication module 112 in case of the phone call mode. The microphone 122 may include assorted noise removing algorithms (or noise canceling algorithms) to remove or reduce noise generated in the course of receiving the external audio signal.

Figure 4:
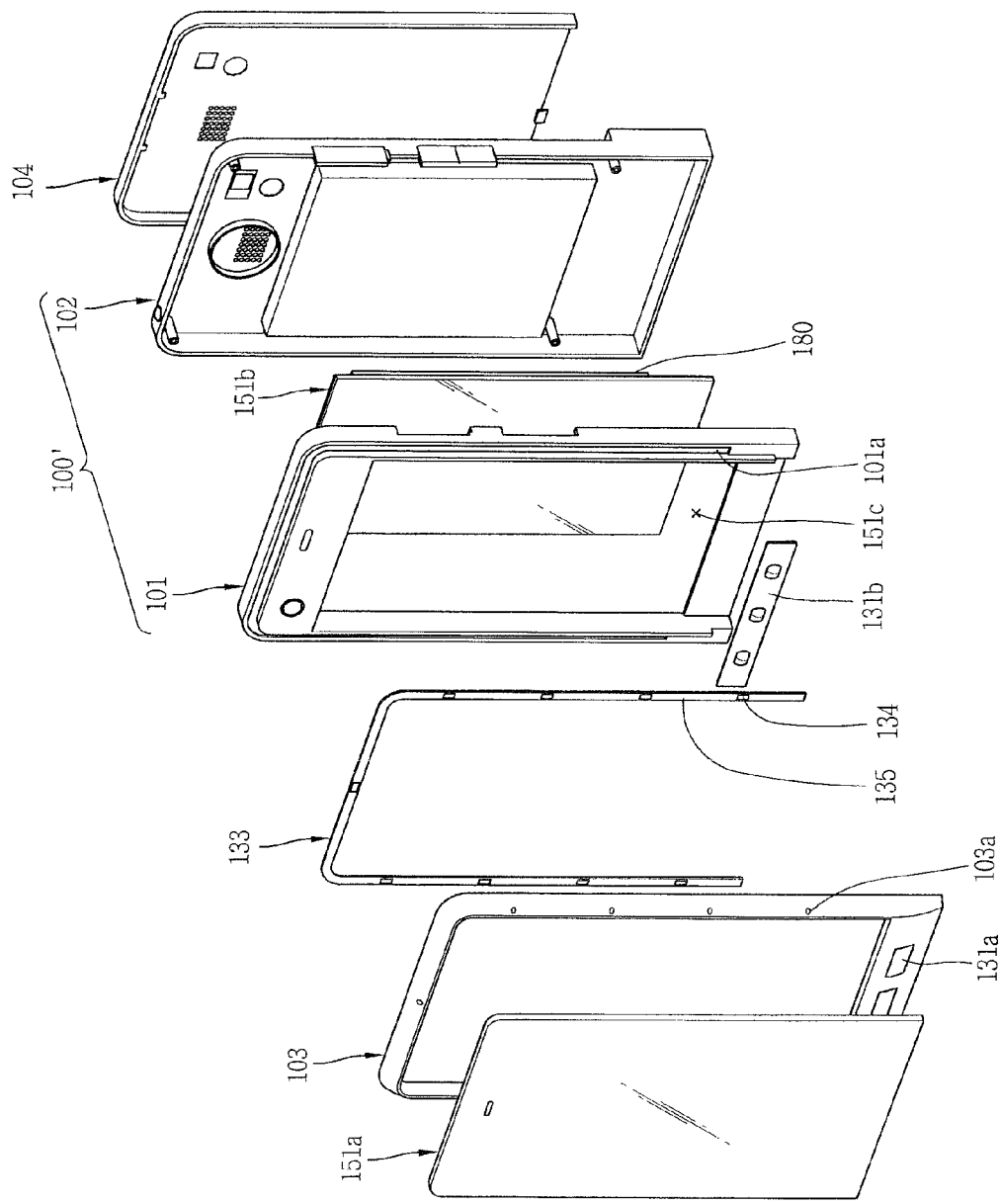
FIG. 4 is a disassembled perspective view of a mobile terminal.

The user input unit 130 may generate input data inputted by a user to control operation of the mobile terminal 100. The user input unit 130 may include a keypad, a dome switch, a touchpad (e.g., static pressure/capacitance), a jog wheel, a jog switch and the like. FIG. 4 shows an optical sensor 134 that may be employed to configure the user input unit 130.

The sensing unit 140 may provide status measurements of various aspects of the mobile terminal 100. For example, the sensing unit 140 may detect an open/close status of the mobile terminal 100, a change in a location of the mobile terminal 100, a presence or an absence of user contact with the mobile terminal 100, a location of the mobile terminal 100, acceleration/deceleration of the mobile terminal 100, and/or the like so as to generate a sensing signal for controlling operation of the mobile terminal 100. For example, with regards to a slide-type mobile terminal, the sensing unit 140 may sense whether a sliding portion of the mobile terminal 100 is open or closed. Other examples include sensing functions, such as the sensing unit 140 sensing presence or absence of power provided by the power supply 190, presence or absence of a coupling or other connection between the interface unit 170 and an external device.

The output unit 150 may output an audio signal, a video signal and/or a tactile signal. The output unit 150 may include the display 151, an audio output module 152, an alarm 153, a haptic module 154, a radiating portion 155 and/or the like.

The display 151 may output information processed in the mobile terminal 100. For example, when the mobile terminal 100 is operating in a phone call mode, the display 151 may provide a User Interface (UI) or a Graphic User Interface (GUI) that includes information associated with the call. As another example, if the mobile terminal 100 is in a video call mode or a capturing mode, the display 151 may additionally or alternatively display images captured and/or received, a UI, or a GUI.

The display 151 may be implemented using at least one of a Liquid Crystal Display (LCD), a Thin Film Transistor-Liquid Crystal Display (TFT-LCD), an Organic Light-Emitting Diode (OLED), a flexible display, a three-dimensional (3D) display, and/or the like.

Displays 151 may be implemented as a transparent type or an optical transparent type through which an exterior is visible, which is referred to as a transparent display. An example of the transparent display may include a Transparent OLED (TOLED), and the like. A rear surface of the display 151 may also be optically transparent. Under this configuration, a user may view an object positioned at a rear side of a terminal body through a region occupied by the display 151 of the terminal body.

The display 151 may be implemented as two or more displays according to a configured aspect of the mobile terminal 100. For example, a plurality of the displays 151 may be arranged on one surface to be spaced apart from each other or the plurality of displays 151 may be integrated with each other, or may be arranged on different surfaces.

If the display 151 and a touch sensitive sensor (hereafter referred to as a touch sensor) have a layered structure therebetween, then the structure may be referred to as a touch screen. The display 151 may be used as an input device rather than an output device. The touch sensor may be implemented as a touch film, a touch sheet, a touch pad, and/or the like.

The touch sensor may convert changes of a pressure applied to a specific part of the display 151 or a capacitance occurring from a specific part of the display 151 into electric input signals. The touch sensor may sense not only a touched position and a touched area, but also a touch pressure.

When touch inputs are sensed by the touch sensors, corresponding signals are transmitted to a touch controller (not shown). The touch controller may process the received signals, and then transmit corresponding data to the controller 180. Accordingly, the controller 180 may sense which region of the display 151 has been touched.

A proximity sensor 141 may be arranged at an inner region of the mobile terminal 100 covered by the touch screen or near the touch screen. The proximity sensor 141 may include a sensor to sense presence or absence of an object approaching a surface to be sensed, or an object provided near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this example, the touch screen (touch sensor) may be categorized as a proximity sensor.

For ease of description, a status that the pointer is positioned proximate to the touch screen without contact may hereafter be referred to as a proximity touch, whereas a status that the pointer substantially comes in contact with the touch screen may hereafter be referred to as a contact touch. For the position corresponding to the proximity touch of the pointer on the touch screen, such position corresponds to a position where the pointer faces perpendicular to the touch screen upon a proximity touch of the pointer.

The proximity sensor 141 may sense proximity touch and proximity touch patterns (e.g., distance, direction, speed, time, position, moving status, etc.). Information relating to the sensed proximity touch and/or the sensed proximity touch patterns may be output on the touch screen.

The audio output module 152 may output audio data received from the wireless communication unit 110 or stored in the memory 160 in a call-receiving mode, a call-placing mode, a recording mode, a voice recognition mode, a broadcast reception mode, and/or so on. The audio output module 152 may output audio signals relating to functions performed in the mobile terminal 100 (e.g., a call received or a message received, and so on). The audio output module 152 may include a receiver, a speaker, a buzzer and/or so on.

The alarm 153 may output signals notifying an occurrence of events from the mobile terminal 100. The events may include a call received, a message received, a key signal input, a touch input and so on. The alarm 153 may output not only video or audio signals, but also other types of signals such as signals notifying occurrence of events in a vibration manner. Since the video or audio signals can be output through the display 151 or the audio output unit 152, the display 151 and the audio output module 152 may be categorized as a part of the alarm 153.

The haptic module 154 may generate various tactile effects that a user can feel. An example of the tactile effects generated by the haptic module 154 may include vibration. Vibration generated by the haptic module 154 may have a controllable intensity, a controllable pattern, and/or so on. For example, a different vibration may be output in a synthesized manner or in a sequential manner.

The haptic module 154 may generate various tactile effects including not only vibration but also arrangement of pins vertically moving with respect to a skin being touched (contacted), an air injection force or air suction force through an injection hole or a suction hole, a touch by a skin surface, presence or absence of contact with an electrode, effects by stimulus such as an electrostatic force, reproduction of cold or hot feeling using a heat absorbing device or a heat emitting device, and the like.

The haptic module 154 may transmit tactile effects (signals) through a user's direct contact, or a user's muscular sense using a finger or a hand. The haptic module 154 may be implemented as two or more modules according to configuration of the mobile terminal 100.

Figure 6:
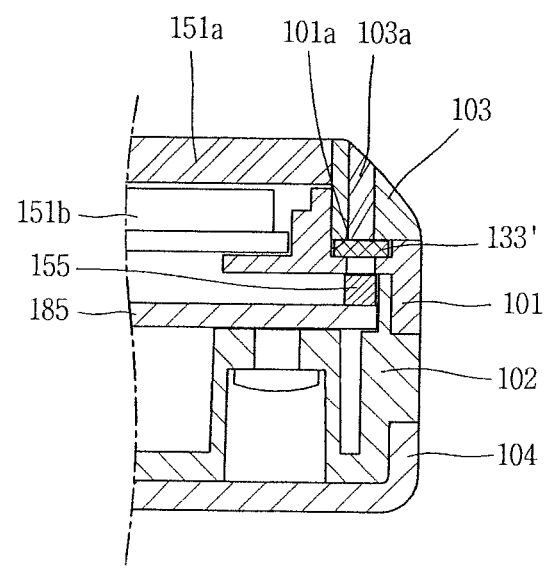
FIG. 6 is a partial section view showing main parts taken along line A-A of FIG. 2 in accordance with a first embodiment.
Figure 7:
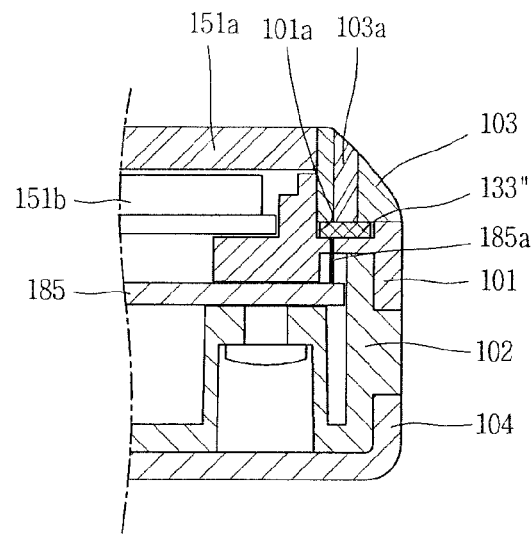
FIG. 7 is a partial sectional view showing main parts taken along line A-A of FIG. 2 in accordance with a second embodiment.

The radiating portion 155 may be provided in positions associated with an input portion so as to generate light for indicating that at least one portion of the input portion is in an active state or an idle state. FIGS. 4, 6 and 7 show input portions 133, 133' and 133". If the input portions 133, 133' and 133" are optical sensors for outputting visible light, then the input portions 133, 133' and 133" may also serve as the radiating portion 155. If the optical sensors output non-visible light, then the radiating portion 155 may be a plurality of light-emitting elements (e.g., LEDs) respectively provided adjacent to different portions of the input portions 133, 133' or 133". Such sensors provided adjacent to the radiating portion 155 may be implemented as different types of sensors (not the optical sensors) such as a pressure sensor, a magnetic sensor, a touch sensor and/or the like.

The memory 160 may store a program for processing and control of the controller 180. The memory 160 may temporarily store input/output data (e.g., phonebook data, messages, still images, video and the like). The memory 160 may also store data related to various patterns of vibrations and audio output upon touch input on the touch screen.

The memory 160 may be implemented using any type of suitable storage medium including a flash memory type, a hard disk type, a memory card type (e.g., SD or DX memory), Random Access Memory (RAM), Static Random Access Memory (SRAM), Read-Only Memory (ROM), magnetic memory, magnetic disk, optical disk, and/or the like. The mobile terminal 100 may also operate a web storage that performs the storage function of the memory 160 on the Internet.

The interface unit 170 may interface the mobile terminal 100 with external devices. The interface unit 170 may allow a data reception from an external device, a power delivery to each component in the mobile terminal 100, or a data transmission from the mobile terminal 100 to an external device. The interface unit 170 may include wired/wireless headset ports, external charger ports, wired/wireless data ports, memory card ports, ports for coupling devices having an identification module, audio Input/Output (I/O) ports, video I/O ports, earphone ports, and/or the like.

The identification module may be configured as a chip for storing various information required to authenticate an authority to use the mobile terminal 100. This may include a User Identity Module (UIM), a Subscriber Identity Module (SIM), and/or the like. The device having the identification module (hereafter referred to as an identification device) may be implemented as a type of smart card. The identification device may be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. The various command signals or power inputted from the cradle may operate as signals for recognizing that the mobile terminal 100 has accurately been mounted to the cradle.

The controller 180 may control overall operations of the mobile terminal 100. For example, the controller 180 may perform control and processing associated with telephony calls, data communications, video calls, and/or the like. The controller 180 may include a multimedia module 181 that provides multimedia playback. The multimedia module 181 may be part of the controller 180 or may be a separate component.

The controller 180 may perform a pattern recognition processing so as to recognize writing or drawing input on the touch screen as text or image.

The power supply 190 may provide power required by various components under control of the controller 180. The provided power may be internal power, external power and/or a combination thereof.

Embodiments may be implemented in a computer-readable medium using, for example, software, hardware, and/or some combination thereof.

For a hardware implementation, embodiments may be implemented within one or more Application Specific Integrated Circuits (ASICs), Digital Signal Processors (DSPs), Digital Signal Processing Devices (DSPDs), other electronic units designed to perform functions described herein, and/or a selective combination thereof. Embodiments may be implemented by the controller 180.

For software implementation, embodiments (such as procedures and functions) may be implemented together with separate software modules each of which may perform at least one of functions and operations. The software codes may be implemented with a software application written in any suitable programming language. The software codes may be stored in the memory 160 and may be executed by the controller 180.

Figure 2:
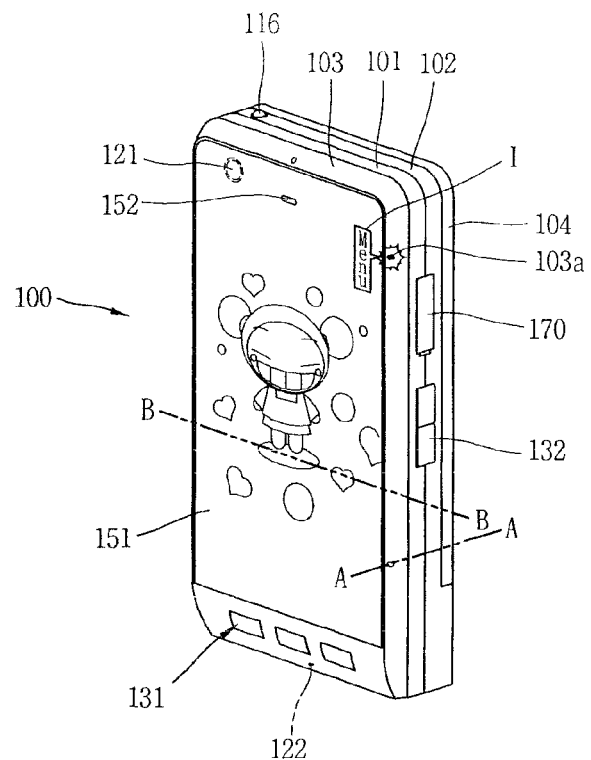
FIG. 2 is a front perspective view of the mobile terminal in accordance with one example embodiment.

FIG. 2 is a front perspective view of the mobile terminal in accordance with one example embodiment. The described mobile terminal has a bar-like body. However, embodiments of the present disclosure are not limited to the bar-like body type, but may also include various types such as a slide type, a folder type, a swing type, a swivel type and/or the like, each having two and/or more bodies coupled to each other to be relatively movable.

A body may include a housing (e.g. case, casing, cover or the like) configuring an external appearance. The housing may be divided into a first or front case 101 and a second or rear case 102. A space formed between the front case 101 and the rear case 102 may accommodate various electric components. At least one intermediate case may be further provided between the front case 101 and the rear case 102. A peripheral member 103 may be provided surround the display 151. The peripheral member 103, formed of a closed curve, may be coupled to the front case 101.

The cases may be injected using a synthetic resin or may be formed of a metal such as stainless steel (STS), titanium (Ti) and/or the like. A terminal body, such as the front case 101, may be provided with the display 151, the audio output module 152, the camera 121, the user input unit 130 (including first and second manipulating units 131 and 132), the microphone 122, the interface unit 170 and the like.

The display 151 may occupy most of a main surface of the front case 101. The audio output module 152 and the camera 121 may be provided at a region adjacent to one of both end portions of the display 151, and the first manipulating unit 131 (as a user input unit) and the microphone 122 may be provided at a region adjacent to another end portion thereof The user input unit 132, the interface unit 170 and the like may be provided at side surfaces of the front case 101 and the rear case 102.

The user input unit 130 may be manipulated to receive a command input for controlling operation of the mobile terminal 100, and may include a plurality of manipulating units (such as the first and second manipulating units 131 and 132). The first and second manipulating units 131 and 132 may be referred to as a manipulating portion. The manipulating portion may be operated by a user in any tactile manner. In addition, a manipulating unit or input portion 133 as shown in FIG. 4 may be further provided below the peripheral member 103 corresponding to a plurality of light-guide portions 103a.

Contents input by the user input units 131, 132 and 133 may be variously set. For example, the first manipulating unit 131 may input commands such as START, END, SCROLL or the like, and the second manipulating unit 132 may input a command, such as adjusting an audio sound, a conversion of the display 151 into a touch-sensitive mode or the like. The input portion 133, as shown in FIG. 4, may input a command for running menus for controlling visual information output on the display 151. FIG. 2 shows a state that guide information I, such as 'menu', may be output on the display 151 at one position of the input portion 133. A radiating portion 135 associated with one position of the input portion 133 may output visible light in order to inform that the input portion 133 is in an active state to receive an input command. Under this state, if a user's finger or the like approaches an light-guide portion 103a associated with one position of the input portion 133 to thereafter input one command in the input portion 133, menus may be displayed for controlling visual information output on the display 151. One of the displayed menus may be selected by touching a region of the display 151 on which the corresponding menu is displayed or by approaching or contacting the user's finger toward or with one of the light-guide portions 103a corresponding to a plurality of portions (positions) of the input portion 133.

Figure 3:
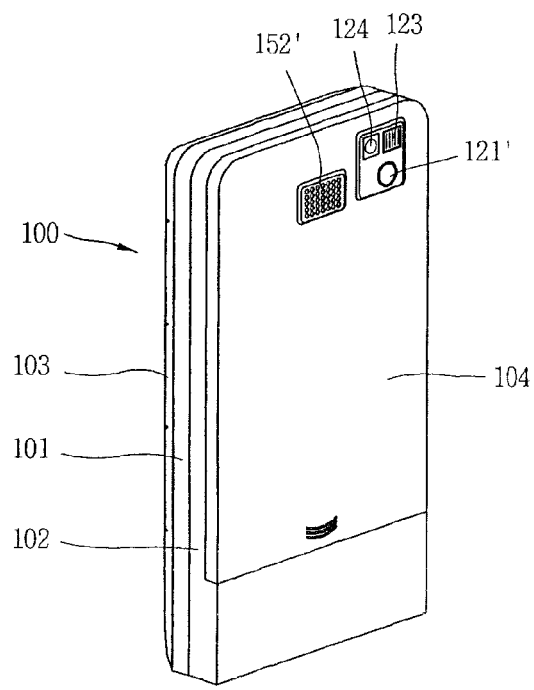
FIG. 3 is a rear perspective view of the mobile terminal in accordance with one example embodiment of the present disclosure.

FIG. 3 is a rear perspective view of the mobile terminal shown in FIG. 2. A rear surface of the terminal body, (i.e. the rear case 102 in the form of being exposed to the exterior via a battery cover 104) may further be provided with a camera 121'. The camera 121' may face a direction that is opposite to a direction faced by the camera 121, and the camera 121' may have different pixels from the camera 121.

For example, the camera 121 may operate with relatively lower pixels (i.e., a lower resolution). Thus, the camera 121 may be useful when a user can capture his face and send it to another party during a video call or the like. On the other hand, the camera 121' may operate with a relatively higher pixels (i.e., higher resolution) such that it can be useful for a user to obtain higher quality pictures for later use. The cameras 121 and 121' may be installed in the terminal body to be rotatable or popped up.

A flash 123 and a mirror 124 may additionally be provided adjacent to the camera 121'. The flash 123 may operate in conjunction with the camera 121' when taking a picture using the camera 121'. The mirror 124 can cooperate with the camera 121' to allow a user to photograph himself in a self-portrait mode.

An audio output module 152' may be further provided at a rear surface of the terminal body. The audio output module 152' may cooperate with the audio output module 152 to provide a stereo output. The audio output module 152' may operate as a speakerphone.

A broadcast signal receiving antenna 124 may be further provided at the side surface of the terminal body in addition to an antenna for communications. The antenna 124 configuring as a part of the broadcast receiving module 111 may be retractable into the terminal body.

The power supply 190 for supplying power to the mobile terminal 100 may be mounted to the terminal body. The power supply 190 may be internally provided at the terminal body, or may be detachably provided outside the terminal body.

As shown in FIG. 2, the display 151 may display various types of visual information. Such visual information may be divided, according to their display forms, into letter (character), number, symbol, graphic, icon and/or the like. For input of such information, at least one type of information among the letter, the number, the symbol, the graphic or the icon may be displayed in a preset arrangement so as to be implemented as a type of keypad. Such a keypad may be referred to as a 'soft key'.

The input portions 133, 133' and 133" may include optical sensors. The optical sensor may output light and sense change in the output light or by the output light. The optical sensor may receive a command by detecting at least one of how an object (e.g., a user's finger) causing a change in light output by the optical sensor is close to (hereafter referred to as an approach) the optical sensor, how long the object is approached, no more approach of the object to the optical sensor, in which direction the approach is released, a number of re-approach after release of the approach, a movement direction of the object obtained by sequentially sensing movement of the object by the plurality of optical sensors.

In relation to the number of re-approach, an example may be where after the user moves his finger close to an optical sensor and then away from the optical sensor, the user may re-approach the optical sensor (hereafter referred to as a double approach). After a command for one optical sensor is input, if a command for another optical sensor is input in a preset direction within a preset time period, such situation may be recognized as different from a case where each optical sensor receives a command input after elapse of the preset time period. Such input may be referred to as an input by a dragging operation.

FIG. 4 is a disassembled perspective view of the mobile terminal shown in FIG. 2. A housing 100' may include the front case 101 and the rear case 102 coupled to each other to accommodate a display 151b therein. The display 151b may be covered by a light-transmissive window 151a. The housing 100' has an opening 151c, and the display 151b may be provided in the opening 151c of the housing 100'. Visual information output on the display 151b may be visible from the outside via the window 151a.

The peripheral member 103 may surround a circumference of the window 151a. The peripheral member 103 may be formed in a shape similar to a rectangular band, and may be coupled to the front case 101. Mechanical keys 131a that are pressed by a user to input a command may be provided at a portion of the peripheral member 103. A switching board 131b may align with the mechanical keys 131a. The switching board 131b may be provided with a switch or switches pressed when the mechanical keys 131a are pressed to thus generate signals.

Another input portion 133 may be aligned with the other portions of the peripheral member 103 and may have a different form from the first input unit 131 provided with the mechanical keys 131a and the switching board 131b. A recess 101a may be formed by recessing three edges of the front case 101 so as to accommodate the input portion 133 therein.

The input portion 133 may include one or more sensors 134 and a sensing circuit 135 to which the sensors 134 are electrically connected. The sensors 134 may be spaced apart from each other so as to align with the light-guide portions 103a formed at the peripheral member 103. If the sensor 134 is an optical sensor capable of outputting visible light, the sensor 134 itself may also serve as the radiating portion 155. The plurality of sensors 134 may all be activated to output visible light. However, only a sensor(s) required for input of a command may selectively be activated to thereby output visible light.

The sensing circuit 135 of the input portion 133 may be electrically connected to a main circuit board 185 to be controlled by the main circuit board 185. The main circuit board 185 may part of the controller 180.

The battery cover 104 may be detachably coupled to the rear case 102. The battery cover 104 may cover a battery implementing the power supply 190 upon being coupled to the rear case 102.

Figure 5:
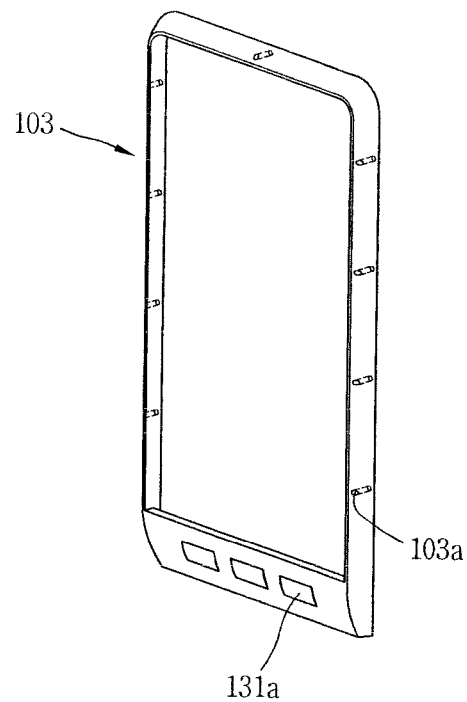
FIG. 5 is a perspective view of a peripheral member shown in FIG. 4.

FIG. 5 is a perspective view of the peripheral member 103 shown in FIG. 4. The peripheral member 103 may have a surface intersecting a surface of the window 151a, due to its form, which may referred to as a bezel. The peripheral member 103 may be formed of a crystal or an injected material that is light-transmissive. If the peripheral member 103 is light-transmissive and also transparent, the peripheral member 103 may provide a visual effect on an outer appearance of the mobile terminal 100.

If the peripheral member 103 is transparent, the front case 101 or configurations provided between the peripheral member 103 and the front case 101 may be exposed to the exterior via the peripheral member 103. To prevent or minimize such a problem, a surface of the peripheral member 103 facing the front case 101 may be provided with a non-light transmissive layer for preventing light transmittance or minimizing the same. The non-light transmissive layer may not be formed at a position where each light-guide portion 103a is provided, considering function of the light-guide portions 103a.

In order to form the non-light transmissive layer, a non-light transmissive paint may be provided on the surface of the peripheral member 103 facing the front case 101, or a non-light transmissive tape may be attached onto the corresponding surface. Alternatively, the corresponding surface may be roughly processed so as to form the non-light transmissive layer.

Even if the non-light transmissive layer is formed, a reflection layer may be formed on the non-transmissive layer such that the non-transmissive layer may not be revealed through the peripheral member 103.

FIG. 6 is a partial section view showing main parts taken along line A-A of FIG. 2 in accordance with a first embodiment. The window 151a and the front case 101 may be formed in a stepped manner with respect to each other. The peripheral member 103 to cover the window 151a may be provided at a stepped portion such that the window 151a and the front case 101 can connect with each other without a step.

The light-guide portion 103a may extend from the surface of the peripheral member 103 facing the front case 101 to another surface of the peripheral member 103 exposed to the outside such that light output from the radiating portion 155 may not be dispersed to other regions of the peripheral member 103 and brighter light may be guided to be output via the shortest path. The light-guide portion 103a may convert an ongoing path of light output from the radiating portion 155 into a path other than the shortest path, e.g., prevents light from dispersing to the sides.

The light-guide portion 103a may be a guide-tube formed of a metal with a high reflectivity of light such as copper, iron and/or the like. Alternatively, the light-guide portion 103a may be one or more optical fibers. The optical fiber may be characterized in that light input from one end thereof can be output through another end thereof, whereby it may minimize dispersion of light to another path during the light being ongoing. The guide-tube or optical fiber may be inserted in a hole formed at the peripheral member 103 or may be injected simultaneously by an insert-injection upon injecting the peripheral member 103.

FIG. 6 shows that the optical sensor 133' may output light with a wavelength out of a wavelength band of visible light (i.e., non-visible light), which indicates that a user may not recognize the light output by the optical sensor 133'. The optical sensor may be a photodiode or an IR emitter with a receiver. The non-visible light emitting sensor is used to determine whether the user has selected or touched the corresponding location. In this configuration, the sensor 133' may be transparent to allow light emitted by element 155' to pass therethrough. Alternatively, the sensor 133' and element 155 may be placed vertically shifted or placed adjacent to each other on the same horizontal plane such that both the sensor 133' and the element 155 utilize the light guide 103a.

In order to allow the user to recognize an operation of the optical sensor 133' through visible light that is output associated with operation of the optical sensor 133', the radiating portion 155 may be further provided in addition to the optical sensor 133'. The radiating portion 155 may be a light-emitting element such as a light emitting diode (LED), for example. In order for light generated from the light-emitting element 155 to smoothly progress toward one end of the light-guide portion 103a, a hole may be formed at a portion of the front case 101 where the light-emitting element 155 is provided. Alternatively, if the front case 101 itself is formed of a light-transmissive material, a hole may not be separately formed.

The light-emitting elements 155 may be controlled such that only a light-emitting element 155 aligned with an optical sensor(s) 133' activated for inputting a command can emit light.

FIG. 7 is a partial sectional view showing parts taken along line A-A of FIG. 2 in accordance with a second embodiment. A sensor configured as an input portion may be integrated with a portion of a touch screen or sensor 133". The touch screen or sensor 133" may be configured by a combination of a display module that is capable of outputting visible light by itself and a touch sensor. For example, an organic light emitting diode (OLED) may be employed as a display module. If a transparent module such as a transparent organic light emitting diode (TOLED) is employed as a display module, then the overall touch screen 133" may be transparently implemented. A touch ITO may be provided on the OLED TOLED, or LED to implement the touch screen or sensor. As the touch screen 133" provided at a lower side of the peripheral member 103 is transparently implemented, when even the peripheral member 103 is transparent, then the mobile terminal may have a transparent and aesthetic effect on its overall outer appearance.

Even though visible light is evenly output through the touch screen 133", brighter light may be output from a portion of the peripheral member 103 aligned with the light-guide portion 103a, which is because the light-guide portion 103a can guide the visible light toward the shortest path without being dispersed.

The touch screen 133" may extend long along the recess 101a. The touch screen 133" may be connected to the main circuit board 185 (or the controller 180) via a connection cable 185a extending through the front case 101.

Figure 8:
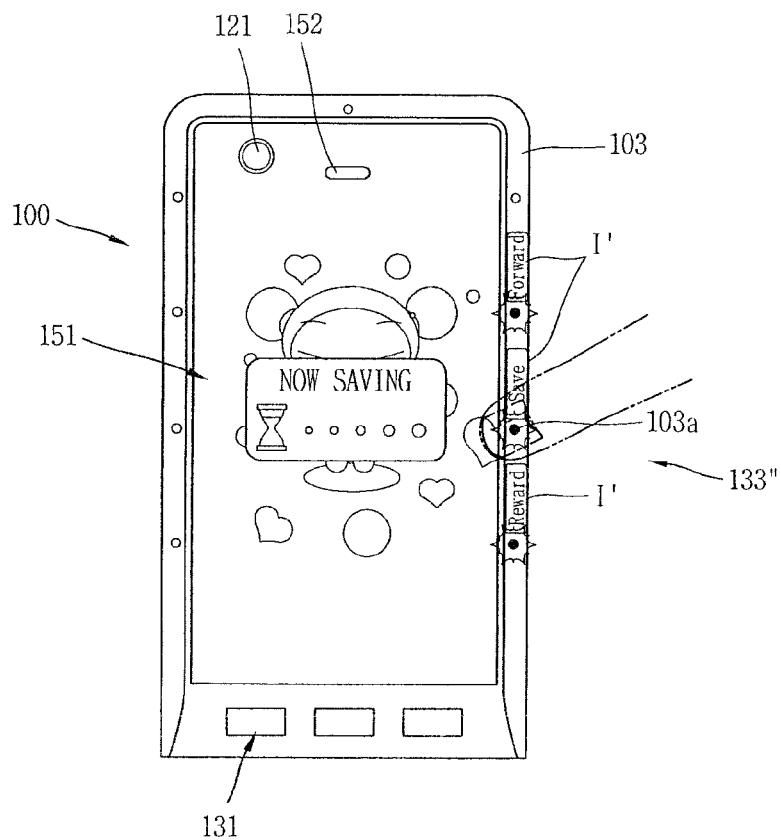
FIG. 8 is a perspective view showing an exemplary operation state of a mobile terminal with a touch screen as an input portion provided below a peripheral member in accordance with a third embodiment.

FIG. 8 is a perspective view showing a mobile terminal with the touch screen 133" in accordance with a third embodiment. A guide information I' may be output on regions adjacent to the light-guide portion 103a of the touch screen 133". When touching an adjacent light-guide portion 103a, the guide information I' may be information relating to a command input at a portion of the touch screen 133" where the touched light-guide portion 103a is provided.

FIG. 8 shows the guide information I' relating to control of visible information displayed on the display 151. The output guide information I' includes 'reward', save and 'forward'. The touch screen 133" may be made of a touch screen display via OELD, LED or LCD with touch ITO such that information displayed in the bezel can change based on application.

When a user touches a portion of the peripheral member 103 corresponding to the light-guide portion 103a adjacent to a portion displaying the 'save', the touch screen 133" detects the touch input, and visible information output on the display 151 may be saved (i.e., stored).

Before or after the input of the command, light may be flickered at a region of the touch screen 133" to be touched or near a touched region of the touch screen 133". Accordingly, the user may visually recognize the touch input or pay attention to the touch input.

When a mobile terminal is in an idle state, the touch screen 133" may be activated by pressing any of the first manipulating unit 131 to thusly output brief information including a current time, a remnant battery capacity, a date and/or the like. In order to check such brief information, the entire display 151, which is larger than the touch screen 133", may not have to be activated.

Figure 9:
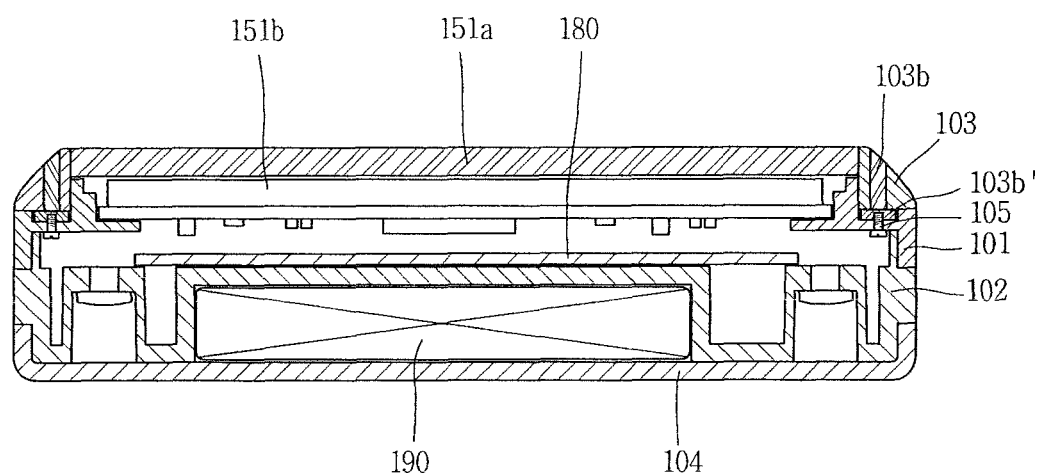
FIG. 9 is a cross-sectional view taken along line B-B of FIG. 2.

FIG. 9 is a cross-sectional view taken along line B-B of FIG. 2. A description may be provided of how to couple the peripheral member 103 to the front case 101. Connection rods 103b may be inserted in portions of the peripheral member 103. The connection rod 103b may be formed similar to the light-guide portion 103a if it is seen from outside of the peripheral member 103. However, unlike the light-guide portion 103a, the connection rod 103b may not guide.

A fixing piece 105 may be inserted in a head 103b', which is a portion of the connection rod 103b facing the front case 101. The fixing piece 105 may be coupled to the head 103b' through the front case 101 via a hole formed through the front case 101. Accordingly, the peripheral member 103 may be coupled to the front case 101 so as not to be separated from the front case 101.

The above described methods and embodiments may be implemented in a medium having a program recorded as computer-readable codes. Examples of such computer-readable media may include ROM, RAM, CD-ROM, magnetic tape, floppy disk, optical data storage element and the like. Such computer-readable medium may be implemented in a type of a carrier wave (e.g., a transmission via an Internet).

A mobile terminal may be configured such that a sensor allowing a command input related to visible information output on a display is provided at corresponding portions of a peripheral member surrounding a window to prevent or relieve the visible information from being partially obscured due to a finger or the like during the command input.

When a specific sensor is activated to input the command, visible light is output from a portion corresponding to the activated sensor such that a user may more easily recognize a target sensor to manipulate.

Light-guide portions may be provided to allow brighter visible light to be output from the portion corresponding to the activated sensor, thereby more clearly representing that such sensor is in the activated state.

A mobile terminal may be capable of outputting visible light associated with an input portion and a method for controlling the output. Visible light may be outputted from different positions associated with an input portion that can receive a command input. A user who manipulates a unit for inputting a command by output of visible light may more easily recognize an object to manipulate.

A mobile terminal may include a housing, a window, a peripheral member, an input portion and a radiating portion. The housing may be provided with a display module. The window may cover the display module to allow visible information output on the display module to be viewable from the exterior. The peripheral member may surround at least one portion of the window by being coupled to the housing. The input portion may be provided at the housing so as to be located in a region corresponding to the peripheral member to receive a command. The radiating portion may be provided in a region corresponding to the peripheral member associated with the input portion, so as to output visible light associated with an operation of the input portion. The radiating portion may selectively emit light associated with a position of the input portion activated for inputting a command.

A sensor constituting the input portion may include an optical sensor that outputs light and senses a change in or by the output light, or a touch sensor that senses the touching on the peripheral member. The radiating portion may serve as the optical sensor if the optical sensor outputs visible light, and may serve as a different light emitting element outputting visible light if the optical sensor outputs non-visible light. The touch sensor may include a touch screen that allows a touch input therethrough and outputs visible light.

The peripheral member may be provided with a light-guide portion formed at the peripheral member and may be configured to guide a progress of visible light output from the radiating portion. The light-guide portion may include a guide-tube or at least one optical-fiber provided in the peripheral member and having an end corresponding to the radiating portion.

A non-transparent layer may be provided in at least a portion of a region surrounding the light-guide portion on a surface of the peripheral member facing the housing. The peripheral member may be formed of a light-transmissive crystal or may be formed by injecting a light-transmissive material.

The peripheral member may include at least one connecting rod inserted in the peripheral member and a fixing piece coupled with the connecting rod through the housing such that the peripheral member and the housing are coupled to each other.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a housing having an opening;
   a display provided in the opening of the housing;
   a bezel provided on the housing;
   a plurality of sensors provided at the bezel, at least one of the sensors detecting an input command on the bezel such that an image on the display changes or a command is performed by the mobile terminal; and
   a plurality of light-emitting elements respectively associated with the plurality of sensors, the light-emitting elements provided at the bezel and being vertically shifted or adjacent to the sensors, and the light-emitting elements to emit visible light through the sensors, and
   wherein at least one of the light-emitting elements generates visible light based on at least one of the sensors detecting the input command, the at least one of the light-emitting elements respectively associated with the at least one sensor detecting the input command, to inform that the at least one sensor is in an active state to receive the input command.

2. The mobile terminal of claim 1, wherein at least a portion of the bezel is transparent.

3. The mobile terminal of claim 2, wherein at least a portion of the housing is transparent with the at least the portion of the bezel that is transparent.

4. The mobile terminal of claim 2, wherein the bezel is transparent at an area where the at least one of the sensors is provided.

5. The mobile terminal of claim 1, wherein the housing includes a front case and a bottom case attached to each other.

6. The mobile terminal of claim 1, wherein the at least one of the sensors is an optical sensor.

7. The mobile terminal of claim 6, wherein the optical sensor is a photodiode.

8. The mobile terminal of claim 6, wherein the optical sensor emits light to indicate a location for user selection.

9. The mobile terminal of claim 1, wherein the at least one of the light emitting elements is provided beneath the at least one of the sensors.

10. The mobile terminal of claim 1, wherein a light guide is provided at the bezel, and the light guide is substantially aligned with the at least one of the sensors.

11. A mobile terminal comprising:
    a housing having an opening;
    a display in the opening of the housing;
    a bezel on the housing;
    a plurality of sensors provided at the bezel, each sensor to detect an input command on the bezel to change an image or to perform a command; and
    a plurality of light-emitting elements each being associated with a separate one of the plurality of sensors, the light-emitting elements provided at the bezel and each being provided to correspond to a separate one of the sensors, and
    wherein a first one of the light-emitting elements to generate visible light based on a corresponding first one of the sensors detecting the input command, to info in that the first one of the sensors is active to receive an input.

12. The mobile terminal of claim 11, wherein each of the light-emitting elements being vertically adjacent to a separate corresponding one of the sensors.

13. The mobile terminal of claim 11, wherein each of the light-emitting elements being adjacent to a separate corresponding one of the sensors.

14. The mobile terminal of claim 11, wherein a portion of the bezel is transparent.

15. The mobile terminal of claim 14, wherein a portion of the housing is transparent with the portion of the bezel that is transparent.

16. The mobile terminal of claim 15, wherein the bezel is transparent at an area where at least one of the sensors is provided.

17. The mobile terminal of claim 11, wherein each of the plurality of sensors is a separate optical sensor.

18. The mobile terminal of claim 17, wherein the optical sensor is a photodiode.

19. The mobile terminal of claim 11, wherein the first one of the light-emitting elements is provided beneath the first one of the sensors.

20. The mobile terminal of claim 11, wherein a light guide is provided at the bezel, and the light guide is substantially aligned with at least one of the sensors.

* * * * *